(No Model.)

J. W. RIGLANDER
MICROMETER GAGE.

No. 443,869. Patented Dec. 30, 1890.

WITNESSES:
William Miller
Edward Wolff

INVENTOR:
Jacob W. Riglander.
BY
Van Santvoord & Hauff
ATTORNEYS

UNITED STATES PATENT OFFICE.

JACOB W. RIGLANDER, OF NEW YORK, N. Y.

MICROMETER-GAGE.

SPECIFICATION forming part of Letters Patent No. 443,869, dated December 30, 1890.

Application filed March 27, 1890. Serial No. 345,580. (No model.)

*To all whom it may concern:*

Be it known that I, JACOB W. RIGLANDER, a citizen of the United States, residing at New York, in the county and State of New York, have invented new and useful Improvements in Gages, of which the following is a specification.

This invention relates to that type of gages wherein the jaws are adapted for internal and external measurements; and the object of the invention is to provide a gage having one pair of jaws constructed for the internal measurement of articles such as bezels and external measurement of articles such as crystals.

To accomplish this object my invention involves the features of construction, the combination or arrangement of devices, and the principles of operation hereinafter described and claimed, reference being made to the accompanying drawings, in which—

Figure 1:
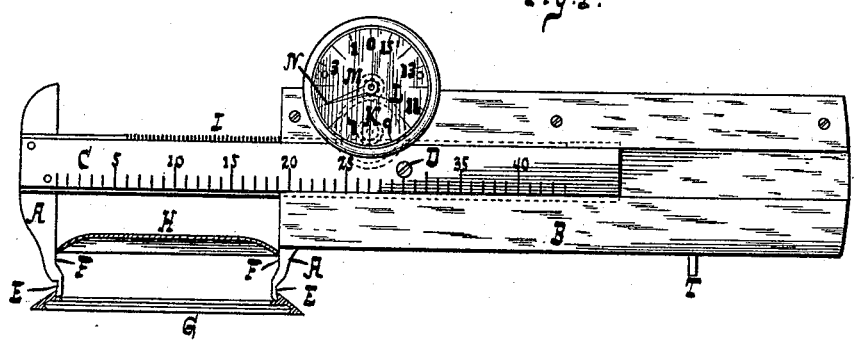
Figure 3:
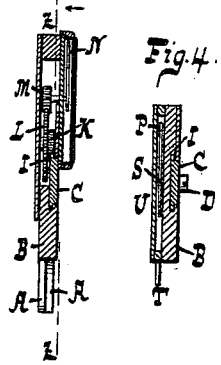
Figure 4:
Figure 2:
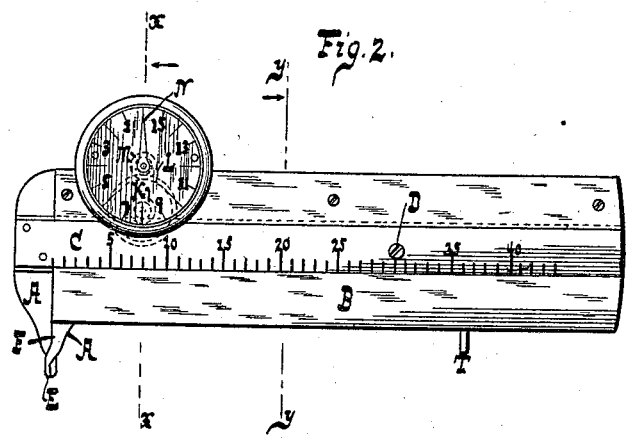
Figure 5:
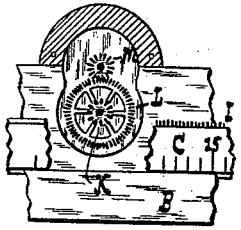
Figure 6:
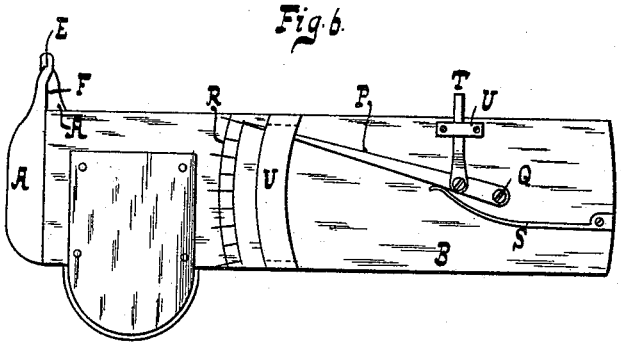

Figure 1 is a face view of the gage in use. Fig. 2 is a face view of the gage closed or out of use. Fig. 3 is a section along $x$ $x$, Fig. 2. Fig. 4 is a section along $y$ $y$, Fig. 2. Fig. 5 is a detail sectional view, the section being taken along $z$ $z$, Fig. 3. Fig. 6 is a rear view of Fig. 2.

The gage is shown as consisting of two jaws A A, one of which is fixed to a handle B, the other jaw being supported by a slide C. The slide C is shown as having a scale to indicate the amount of separation of the jaws. A finger button or stud D enables the slide to be readily moved back and forth. Each of the jaws A has an outer gaging-face E and an inner gaging-face F. The gaging-faces E F of each jaw are on line with one another, so that if the outer faces E are used to ascertain the dimension of such an object as a ring or bezel or other object the inner faces F will give the dimension of such an object as a crystal object or glass H, which corresponds to said ring or bezel.

The slide C is connected by gearing to an index. The gearing is shown as consisting of a rack I on the slide gearing into a pinion K, connected to a gear-wheel L, which gears into a pinion M, to which is connected an index N, traveling over a suitable dial. The gearing is preferably arranged so that the index makes one complete revolution for each division of the scale, whereby fractional parts of a division can be readily ascertained by the index having made only part of a revolution.

To the back of handle B is shown secured an index P, swinging on pivot Q. The index is made to travel over a scale R. A spring S forces the index to the starting-point, and an arm T, pivoted to the index, enables the index to be moved over the scale R. The index P and arm T can be suitably guided and protected against dislocation by guides or bridges U. The index P serves as a height-gage; but such height-gage may be omitted from the device, if desired.

By my invention a single pair of jaws projecting in the same direction from one edge of the handle B and slide C can be employed for internal and external measurements, which simplifies the construction, and is very desirable and useful for such purposes as fitting watch-crystals to bezels.

What I claim as new, and desire to secure by Letters Patent, is—

A gage consisting of the handle having at one extremity a projecting jaw, and the slide carried by the handle and having at its outer extremity a similar projecting jaw, said pair of jaws extending in the same direction and each formed with an inner and an outer rectilinear gaging-face located in alignment with each other, and those of one jaw being parallel to and coextensive with those on the other jaw, the construction and organization being substantially as shown, to enable the two jaws to enter a bezel or other object for the internal measurement thereof and to bear against the edge of a crystal or other object for the external measurement thereof.

In testimony whereof I have hereunto set my hand in the presence of two subscribing witnesses.

JACOB W. RIGLANDER.

Witnesses:
 WM. C. HAUFF,
 E. F. KASTENHUBER.